(12) United States Patent
Wang et al.

(10) Patent No.: US 8,064,426 B2
(45) Date of Patent: Nov. 22, 2011

(54) METHOD AND SYSTEM FOR TRANSMITTING A BROADCAST/MULTICAST SERVICE

(75) Inventors: Yingmin Wang, Beijing (CN); Yu Ding, Beijing (CN)

(73) Assignee: China Academy of Telecommunications Technology, Haidian District, Beijing (CN)

( * ) Notice: Subject to any disclaimer, the term of this patent is extended or adjusted under 35 U.S.C. 154(b) by 0 days.

(21) Appl. No.: 12/312,541

(22) PCT Filed: Nov. 19, 2007

(86) PCT No.: PCT/CN2007/003257
§ 371 (c)(1),
(2), (4) Date: Dec. 10, 2009

(87) PCT Pub. No.: WO2008/061442
PCT Pub. Date: May 29, 2008

(65) Prior Publication Data
US 2010/0110912 A1 May 6, 2010

(30) Foreign Application Priority Data
Nov. 20, 2006 (CN) .......................... 2006 1 0114651

(51) Int. Cl.
*H04B 7/212* (2006.01)
*H04J 3/00* (2006.01)
(52) U.S. Cl. .......................... 370/347; 370/337; 455/441
(58) Field of Classification Search .................. 370/312, 370/337, 347; 455/441
See application file for complete search history.

(56) References Cited

U.S. PATENT DOCUMENTS

| | | | |
|---|---|---|---|
| 2006/0067206 A1* | 3/2006 | Mantravadi et al. | 370/208 |
| 2006/0146755 A1* | 7/2006 | Pan et al. | 370/334 |
| 2007/0064669 A1* | 3/2007 | Classon et al. | 370/347 |
| 2007/0201350 A1* | 8/2007 | Papasakellariou | 370/208 |
| 2008/0049692 A1* | 2/2008 | Bachu et al. | 370/338 |
| 2008/0080471 A1* | 4/2008 | Rinne | 370/343 |
| 2008/0084845 A1* | 4/2008 | Kuchibhotla et al. | 370/331 |
| 2008/0101326 A1* | 5/2008 | Zhang et al. | 370/345 |
| 2009/0279589 A1* | 11/2009 | Nguyen | 375/141 |

FOREIGN PATENT DOCUMENTS

| | | |
|---|---|---|
| CN | 1215269 | 4/1999 |
| CN | 1797987 | 7/2006 |
| WO | WO 2006/099326 | 9/2006 |

* cited by examiner

*Primary Examiner* — Ricky Ngo
*Assistant Examiner* — Paul Masur
(74) *Attorney, Agent, or Firm* — Barnes & Thornburg LLP

(57) ABSTRACT

The present application discloses a method and system for transmitting a Broadcast/Multicast Service (MBMS), which is used for solving the problem that macro cell coverage of the MBMS and macro diversity combining of multi-cells cannot be implemented efficiently based on a frame structure of the existing Time Division-Synchronous Code Division Multiple Access (TD-SCDMA) system in prior art. The method includes: mapping a channel estimation code and data symbols of a Broadcast/Multicast Service to a resource unit, wherein the channel estimation code is mapped in front of the data symbols in a signal frame at a time slot for all services or a time slot for the MBMS; and transmitting the resource unit. Using the present application, efficiency and performance of transmitting a MBMS are improved, and the multi-cells combining of the MBMS and deployment of the MBMS with a macro cell mechanism are implemented efficiently.

18 Claims, 5 Drawing Sheets

--Prior Art--

--Prior Art--

METHOD AND SYSTEM FOR TRANSMITTING A BROADCAST/MULTICAST SERVICE

CROSS-REFERENCE TO RELATED APPLICATIONS

The present invention is a 35 USC 371 national stage entry of PCT/CN2007/003257, filed Nov. 19, 2007, which claims priority from Chinese Patent Application No. 200610114651.9, filed Nov. 20, 2006, the contents of which are herein incorporated by reference in their entirety.

FIELD OF THE INVENTION

The present invention relates to a Code Division Multiple Access system based on Time Division structure in the field of communication, and in particular to a method and system for transmitting a Broadcast/Multicast Service.

BACKGROUND OF THE INVENTION

Numerous multimedia application services, such as Video-On-Demand, television broadcast, video conferencing, online education, and interactive games, have emerged along with rapid development of mobile communication and the Internet, and a plurality of users need to receive the same data simultaneously. These mobile multimedia services are characterized by a large amount of data, a long duration, etc., as compared with general service. For effective utilization of mobile network resources, the Third Generation Mobile Communication Standardization organization (i.e. 3rd Generation Partnership Project (3GPP)) has proposed the Multimedia Broadcast/Multicast Service (MBMS). The MBMS refers to a point-to-multipoint service for transmitting data to a plurality of users from one data source, which enables sharing of network resources including mobile core network and access network resources, particularly air interface resources. The MBMS is different from the existing Cell Broadcast Service (CBS) in a mobile network. The CBS is a message-based service which allows low bit rate data to be transmitted to all users via a cell shared broadcast channel. The MBMS defined by the 3GPP can accomplish not only the multicast and broadcast of plain-text and low rate messages but also the multicast and broadcast of high rate multimedia services, e.g., a mobile TV service.

To efficiently utilize radio resources, network sides in broadcast and multicast modes typically transfer information to multiple User Equipments (UEs) using a common wireless channel. At present, it is defined in a 3GPP protocol that a transmission channel bearing point-to-multipoint transfer in the MBMS is a Forward Access Channel (FACH) and a corresponding physical channel is a Secondary Common Control Physical Channel (S-CCPCH). Because the Multimedia Broadcast/Multicast Service has a large amount of data and reception objects positioned in multiple points at uncertain positions, the same information needs to be transmitted by multiple network equipments through omnidirectional transmission at relatively large power, so that the whole cell can be covered by the transmitted information. In the case of a single frequency operation, a relatively large interference may occur between adjacent cells supporting the MBMS, so that performance of the system is reduced and the application of the Broadcast/Multicast Service is constrained.

In the existing MBMS protocols, selective combining and soft combining modes for the point-to-multipoint transmission are also defined to reduce the interference between the adjacent cells. The selective combining is achieved by the counting of a Radio Link Controller Protocol Data Unit (RLC PDU). That is, when MBMS wireless bearer rates of the adjacent cells are close to each other, and MBMS data streams from different cells do not exceed capability of reordering of a User Equipment Radio Link Controller (UE RLC), the UE may perform the selective combining. The soft combining mode requires a physical layer of a terminal to be capable of combining bit data from physical channels of different wireless links. For example, the terminal combines S-CCPCHs of two network equipments. To achieve the combining, the different S-CCPCHs need to adopt the same transmission format combination and the same data field, and the network side needs to determine cells that may be combined and directly notify the terminal about wireless frames of the S-CCPCHs that need to be combined.

However, in an existing Time Division Duplex (TDD) system, there is no requirement of macro diversity for the UE. The so-called macro diversity means that the UE maintains communicating with two or more network equipments simultaneously, so as to improve quality of the received signal. Therefore, a UE receiver with general design cannot meet the requirement of the above mentioned selective combining and soft combining for the MBMS.

Moreover, in a wireless frame structure of an existing Time Division Synchronous Code Division Multiple Access (TD-SCDMA) system as shown in FIG. 1, each wireless subframe has duration of 5 ms and occupies 6400 chips in total, and is composed of 7 normal service time slots and 3 special time slots. As shown in FIG. 2, burst structure parameters of a normal service time slot include a training sequence (a channel estimation code) for channel estimation positioned in the middle of the burst structure, data symbols for transmitting service data and positioned at the both sides of the burst structure, and a Guard Period (GP) which is a duration extension for guarding the next time slot. In FIGS. 1 and 2, duration Tc of one chip is 0.781 μs, duration Tts of one time slot is 675 μs, duration T of the channel estimation is 0.781×144=112.5 μs, and duration Tgp of the Guard Period is 0.781×16=12.5

The capability of receiving multipath of the MBMS (that is, the capability of receiving multipath energy from multiple cells) depends on a size of an extension cycle window in the structure of the channel estimation code. If a signal falls outside the extension cycle window, the existing channel estimation based on a Fast Fourier Transform (FFT) method cannot be achieved. Since it is required that the multipath of the MBMS does not interfere with other service time slots, a size of the Guard Period in the time slot structure also constrains the capability of receiving the multipath of the MBMS. That is, the capability of receiving the multipath of the MBMS depends on the two parameters of the extension cycle window and the Guard Period of the channel estimation code. In the existing TD-SCDMA system, the values of these two parameters each are 16 chips, which is equivalent to a transmission distance of d=12.5×10-6×3×108=3750 m=3.75 km. Such a transmission distance indicates that a signal from a cell beyond 3.75 km does not fall within a valid multipath reception window, instead brings about interference. Further, a radius of a cell is limited to be within 3.75 km, so that the coverage of the cell is reduced.

In view of the above, based on the structure of a wireless frame of the existing TD-SCDMA system, a scheme of time diversity combining and a scheme of macro diversity based on joint detection are proposed for the TDD system. In the method of time diversity combining, the time when the same information is transmitted from different cells is controlled so that the information arrives at the terminal at different time slots, accordingly, the UE sequentially processes the information from the different cells at the different time slots and then combines the processed information, thereby avoiding the requirement for the UE to perform reception from multiple links simultaneously. To realize the time diversity combining, the cells bearing the MBMS are divided into different sets, each of which is assigned to a unique time slot or time slot combination, and the time slots or time slot combinations do not overlap in time. When a set of cells transmits information at the assigned time slot, other sets of cells are in an inactivated state. Data is received by the UE from the different sets of cells, and combined at the physical layer or an RLC layer. As shown in FIG. 3, three time slots (t1, t2, and t3) are assigned for the MBMS transmission. The same signals from different cells are received by the UE at the three time slots t1, t2 and t3, respectively, and are combined at the physical layer or the RLC layer to improve the reception performance. In the scheme of time diversity proposed for the TDD system, the interference between the adjacent cells is reduced at the expense of channel capacity. For example, the above three time slots t1, t2 and t3 are assigned to three MBMS sets, respectively. When the time slot t1 is used by a set 1, data cannot be transmitted from sets 2 and 3 at the time slot t1, which wastes the system resources greatly. Such scheme satisfies the MBMS service performance at the price of an increase of the consumed system resources, and therefore is not adopted in the present product application implementation of the MBMS. As for the scheme of macro diversity based on joint detection, both the limited capability of the joint detection of a terminal (which supports joint detection of only 3-4 cells at present) and broadcast service limitation due to the structure of the wireless frame of the existing TD-SCDMA system limit the number of cells of the macro diversity based on the joint detection method at the terminal, thus the macro diversity combining of multi-cells and the macro cell coverage for the MBMS cannot be efficiently achieved.

Further, in a Long Term Evolution (LTE) system, the 3GPP organization adopts a modulation mode of Orthogonal Frequency Division Multiplex (OFDM) in the evolution design of a 3G system (Frequency division duplex (FDD) and Time division duplex (TDD)), where a macro diversity of a Single Frequency Network (SFN) mode is adopted for the evolution of the MBMS technology and a frame structure with a long Cyclic Period (CP) is adopted to implement the SFN macro diversity technology.

The implementation scheme of the existing SFN technology is as follows: the same temporal resources, frequency resources, scrambling code and channel estimation code used for a broadcast service are collectively allocated for all cells in the SFN network, and the temporal resources, the frequency resources, the scrambling code and the channel estimation code are also used by a UE in a cell to receive the broadcast service, that is, as long as a signal from a cell in the SFN network falls within the window of a multipath receiver of the UE, the UE may integrate energies of all such signals falling within the reception window directly at an air interface to thereby improve greatly reception performance of the broadcast service. The purpose of the design of the frame structure with a long CP is to expand the multipath reception window of the UE, to enable the UE to receive a broadcast signal from a farther cell.

To sum up, the diversity technology adopted based on the frame structure of the existing TDD TD-SCDMA system can efficiently implement neither the macro cell coverage of the Broadcast/Multicast Service, nor the macro diversity combining of more cells.

SUMMARY OF THE INVENTION

In view of the above, according to the present invention, a method and system for transmitting a Broadcast/Multicast Service is provided, to solve the problem in the prior art that macro cell coverage of the Broadcast/Multicast Service and macro diversity combining of multi-cells cannot be efficiently achieved based on the frame structure of the existing TD-SCDMA system.

The present invention provides the following technical solutions.

A method for transmitting a signal of a Broadcast/Multicast Service including:

mapping a channel estimation code and data symbols of the Broadcast/Multicast Service to a resource unit, where the channel estimation code is mapped in front of the data symbols in a signal frame at a time slot for all services or the Broadcast/Multicast Service; and transmitting the resource unit.

One channel estimation code is present in each signal frame.

The signal frame at the time slot for all services is composed of the channel estimation code and the data symbols, where an extension cycle window in the channel estimation code is used as a Guard Period between adjacent signal frames.

The signal frame at the time slot for the Broadcast/Multicast Service includes the channel estimation code and the data symbols, where an extension cycle window in the channel estimation code is used as a Guard Period between adjacent signal frames.

A length of the signal frame is determined according to data transmission efficiency, coverage of a cell and number of cells of macro diversity.

A length of the extension cycle window of the channel estimation code in the signal frame is determined according to the coverage of the cell and the number of cells of macro diversity.

The signal frame further includes a Guard Period.

A length of a basic channel estimation code of the channel estimation code in the signal frame is smaller than a length of a basic channel estimation code at a time slot for other service in the signal frame, and the length of the extension cycle window of the channel estimation code and a length of the Guard Period are larger than a length of an extension cycle window and a length of a Guard Period in the time slot for the other service.

The length of the Guard Period is equal to the length of the extension cycle window in the channel estimation code.

A length of the signal frame at the time slot for the Broadcast/Multicast Service is equal to a length of the signal frame at the time slot for the other service, where a length of the data symbols is equal to a length of data symbols of the time slot for the other service, and the length of the channel estimation code is smaller than a length of a channel estimation code of the time slot for the other service.

A maximum transmission power at the time slot for the Broadcast/Multicast Service is larger than a maximum transmission power at the time slot for the other service.

A receiving side having received the resource unit acquires the channel estimation code for processing from a starting position of the signal frame at the time slot for all services or the Broadcast/Multicast Service.

When the receiving side moves at a low speed, channel estimation is performed according to a channel estimation code in a signal frame bearing a signal of the Broadcast/Multicast Service, and when the receiving side moves at a high speed, channel estimation is performed according to an interpolation value derived from channel estimation codes in two adjacent signal frames bearing the signals of the Broadcast/Multicast Service.

According to the present invention, there is provided a network equipment including:

a mapping unit adapted for mapping a channel estimation code and data symbols of a Broadcast/Multicast Service to a resource unit, where the channel estimation code is mapped in front of the data symbols in a signal frame at a time slot for all services or the Broadcast/Multicast Service; and a transmitting unit adapted for transmitting the resource unit.

When the mapping unit maps the signal frame at the time slot for all services, a length of the signal frame is determined according to data transmission efficiency, coverage of a cell and number of cells of macro diversity.

A length of an extension cycle window of the channel estimation code in the signal frame is determined by the mapping unit according to the coverage of the cell and the number of the cells of macro diversity.

When the mapping unit maps the signal frame at the time slot for the Broadcast/Multicast Service, a length of a basic channel estimation code of the channel estimation code is smaller than a length of a basic channel estimation code at a time slot for another service in the signal frame, and a length of an extension cycle window in the channel estimation code and a length of a Guard Period are larger than a length of an extension cycle window and a length of a Guard Period at the time slot for the other service.

The length of the Guard Period is identical to the length of the extension cycle window in the channel estimation code.

According to the present invention, there is provided a communication system, including:

a network equipment adapted for mapping a channel estimation code and data symbols of a Broadcast/Multicast Service to a resource unit, where the channel estimation code is mapped in front of the data symbols in a signal frame at a time slot for all services or the Broadcast/Multicast Service, and for transmitting the resource unit; and a User Equipment adapted for receiving the resource unit, and acquiring the channel estimation code for processing from a starting position of the signal frame at the time slot for all services or the Broadcast/Multicast Service.)

The network equipment includes:

a mapping unit adapted for mapping the channel estimation code and the data symbols of the Broadcast/Multicast Service to the resource unit, where the channel estimation code is mapped in front of the data symbols in the signal frame at the time slot for all services or the Broadcast/Multicast Service; and a transmitting unit adapted for transmitting the resource unit.

When the terminal equipment moves at a low speed, channel estimation is performed according to a channel estimation code in a signal frame bearing a signal of the Broadcast/Multicast Service, and when the terminal equipment moves at a high speed, channel estimation is performed according to an interpolation value derived from channel estimation codes in two adjacent signal frames bearing the signals of the Broadcast/Multicast Service.

The present invention is advantageous as follows.

A structure of a signal frame for transmitting a signal of a Broadcast/Multicast Service is provided for a CDMA system of a time division structure according to the present invention. In the structure of the signal frame, a channel estimation code is positioned in front of data symbols. The channel estimation code is not only used for channel estimation, but also used as a Guard Period for reducing interference between two signal frames, which improves transmission efficiency of the MBMS. By using the frame structure, a length of an extension cycle window can be extended by shortening a length of a basic channel estimation code, thereby satisfying requirements for macro diversity reception of multi-cells and macro cell coverage of the MBMS.

To comply with various states and satisfy various requirements, a structure of a broadcast time slot when the MBMS is multiplexed along with other service using a carrier is further provided according to the present invention. In the structure of the broadcast time slot, which is based on a frame structure of an existing TD-SCDMA system, two data blocks at a conventional time slot are combined, a channel estimation code is positioned at a starting position of the broadcast time slot, and a length of an extension cycle window of the channel estimation code and a length of a Guard Period are correspondingly extended by shortening a length of a basic channel estimation code while maintaining the length of the time slot and the length of the data block unchanged. The length of the Guard Period is equal to the length of the extension cycle window. Furthermore, in the broadcast time slot, the extension cycle window can also be used as a Guard Period without providing for an additional Guard Period. By using the structure of the broadcast time slot, macro diversity combining of multi-cells and macro cell coverage of the MBMS based on a 3G system are achieved without introducing any influence on existing voice and data services of the 3G system.

By using the structure of the signal frame and the structure of the broadcast time slot according to the present invention, the macro cell coverage of the MBMS can be achieved by increasing transmission power. Moreover, the channel estimation method used in the present invention is simple and accurate, and eliminates the interference of the channel estimation with a data signal, thereby acquiring a clean data signal for demodulation and improving reception quality of the MBMS.

DETAILED DESCRIPTION OF THE EMBODIMENTS

According to the present embodiment, a Multimedia Broadcast/Multicast Service is transmitted independently using a carrier resource, a signal frame is composed of data symbols and a channel estimation code positioned in front of the data symbols, and an extension cycle window of the channel estimation code is used as a Guard Period between two adjacent signal frames. Furthermore, an MBMS may also be multiplexed and transmitted along with another service with a carrier resource, an MBMS time slot may be composed of only data symbols and a channel estimation code positioned in front of the data symbols, and an extension cycle window of the channel estimation code is used as a Guard Period between two adjacent signal frames. The MBMS time slot may also be composed of data symbols, a channel estimation code positioned in front of the data symbols and a Guard Period positioned after the data symbols.

Figure 1:
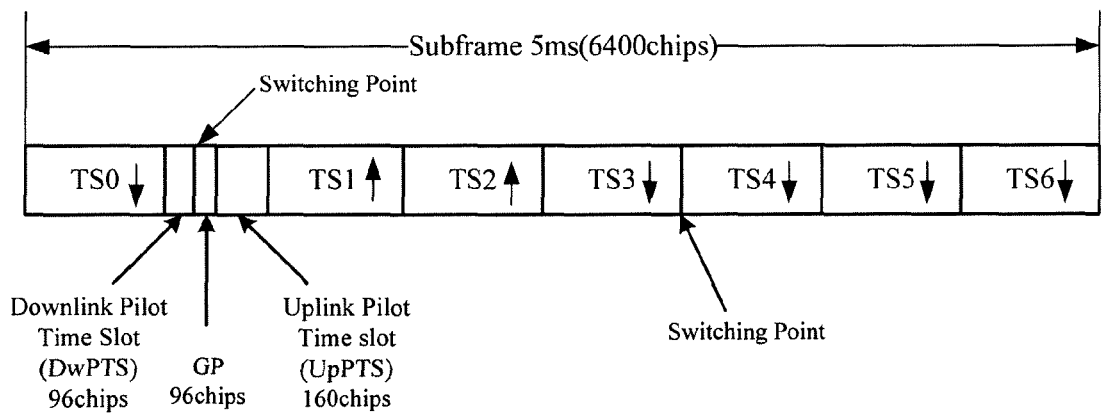
FIG. 1 is a schematic diagram of a frame structure of the TD-SCDMA system in the prior art.
Figure 2:
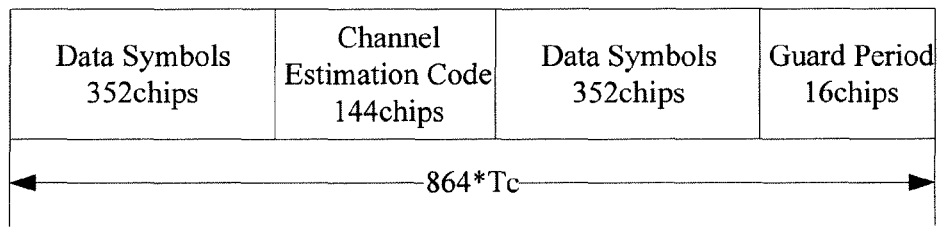
FIG. 2 is a schematic diagram of a burst structure of a service time slot in the prior art.
Figure 3:
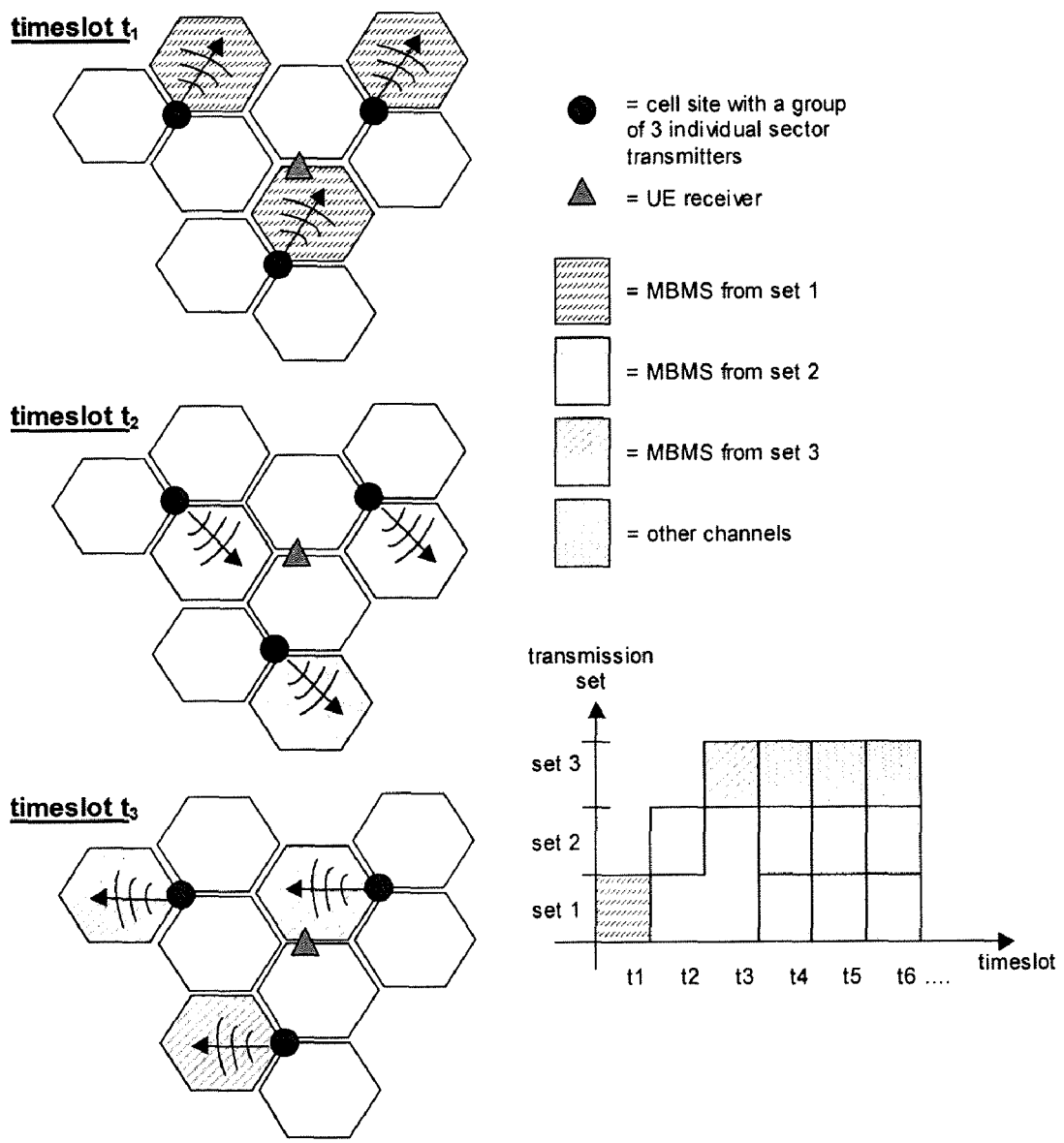
FIG. 3 is a schematic diagram of the implementation of time diversity combining in the prior art.
Figure 4:
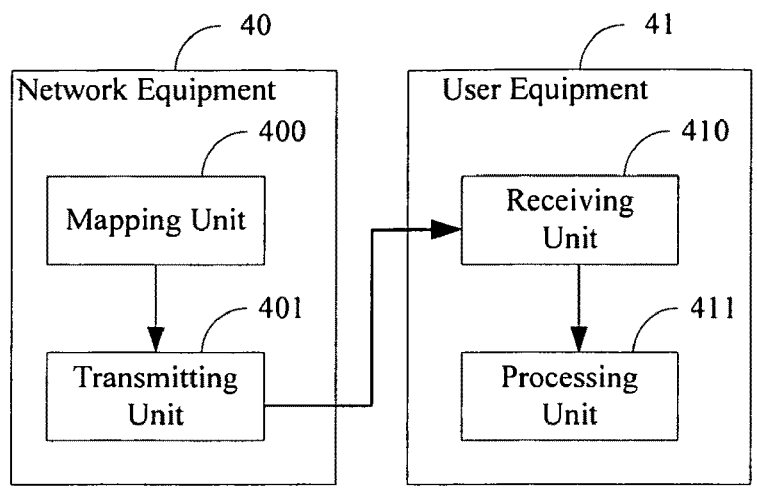
FIG. 4 is a schematic diagram of a communication system structure according to an embodiment of the present invention.

As shown in FIG. 4, a communication system according to the present embodiment includes a network equipment 40 for mapping a channel estimation code and data symbols of a Broadcast/Multicast Service into a resource unit and transmitting the resource unit, the channel estimation code being mapped in front of the data symbols in a signal frame at a time slot for all services or the Broadcast/Multicast Service, and a User Equipment 41 for receiving the resource unit and acquiring the channel estimation code for processing from a staring position of the signal frame at the time slot for all services or the Broadcast/Multicast Service.

The network equipment 40 includes a mapping unit 400 for mapping the channel estimation code and the data symbols of the Broadcast/Multicast Service into the resource unit, the channel estimation code being mapped in front of the data symbols in the signal frame at the time slot for all services or the time slot for the Broadcast/Multicast Service, and a transmitting unit 401 for transmitting the resource unit. A structure of the signal frame at the time slot for all services is composed of data symbols and a channel estimation code positioned in front of the data symbols, and a length of the signal frame can be determined according to data transmission efficiency, cell coverage and a number of the cells of macro diversity, where a length of an extension cycle window of the channel estimation code may be determined according to the cell coverage and the number of the cells of macro diversity. A structure of the signal frame at the time slot for the Broadcast/Multicast Service is composed of data symbols, a channel estimation code positioned in front of the data symbols and a Guard Period positioned after the data symbols, where a length of a basic channel estimation code of the channel estimation code is smaller than a length of a basic channel estimation code at another service time slot in the signal frame, a length of an extension cycle window of the channel estimation code and a length of the Guard Period are larger than a length of an extension cycle window and a length of the Guard Period in the other service time slot, and the length of the Guard Period is equal to the length of the extension cycle window.

The User Equipment 41 includes a receiving unit 410 for receiving the resource unit transmitted from the network equipment 40 and acquiring the corresponding channel estimation code from the starting position of the signal frame at the time slot for all services or the time slot for the Broadcast/Multicast Service of the resource unit, and a processing unit 411 for performing channel estimation according to the acquired channel estimation code, removing interference of the channel estimation code with a data signal according to the channel estimation code and the channel estimation, and demodulating the received data after the interference is removed.

Figure 5:
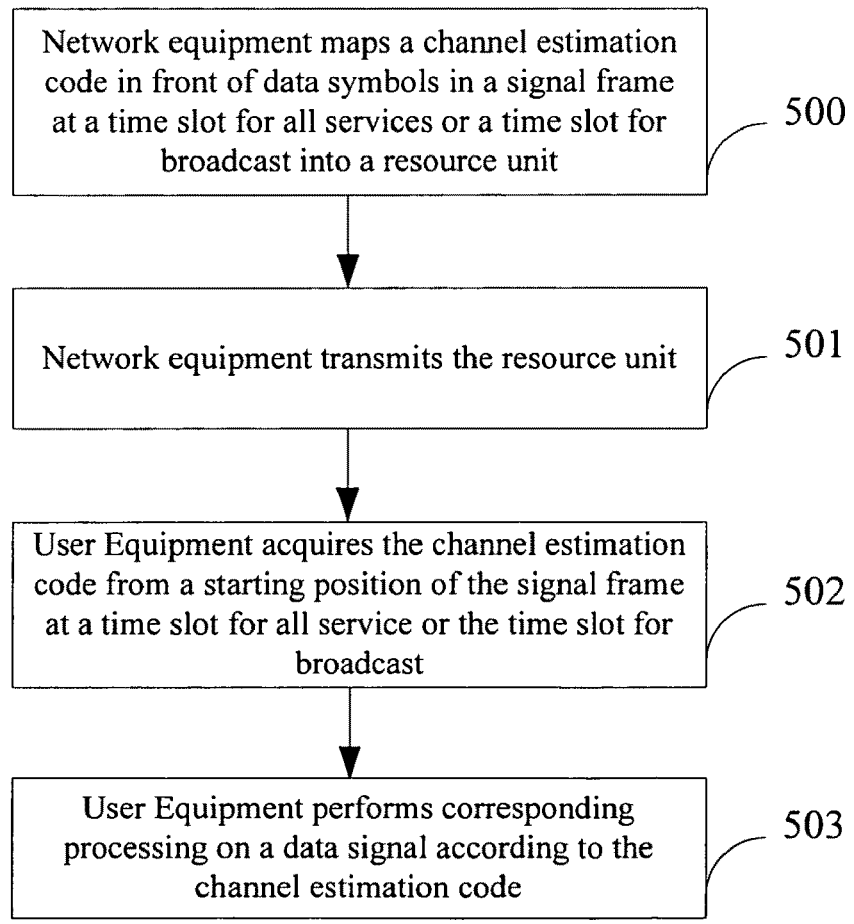
FIG. 5 is a flow chart of transmitting an MBMS according to an embodiment of the present invention.

A flow for transmitting a Broadcast/Multicast Service according to the present embodiment is shown in FIG. 5.

In step 500, the network equipment maps a channel estimation code and data symbols of the Broadcast/Multicast Service into a resource unit. The channel estimation code is mapped in front of the data symbols in a signal frame at a time slot for all services or a time slot for a Broadcast/Multicast Service.

In step 501, the network equipment transmits the resource unit to the User Equipment.

In step 502, after receiving the resource unit, the User Equipment acquires the channel estimation code from the starting position of the signal frame at the time slot for all services or the time slot for the Broadcast/Multicast Service.

In step 503, the data signal is processed according to the acquired channel estimation code.

Figure 6:
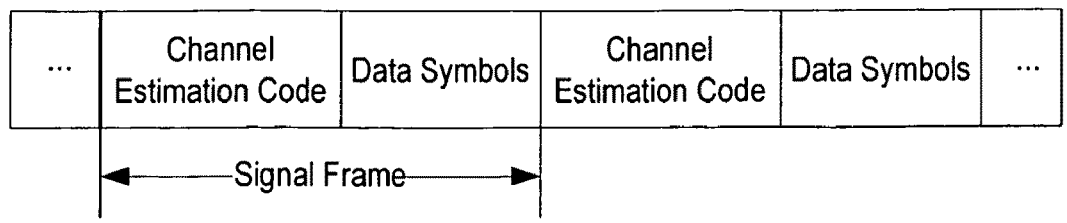
FIG. 6 is a schematic diagram of a signal frame structure for transmitting an MBMS according to an embodiment of the present invention.

According to the present embodiment, when an MBMS is transmitted independently using a carrier resource or is multiplexed and transmitted along with other service with a carrier resource, a structure of a signal frame of the MBMS is shown in FIG. 6. In the signal frame, the channel estimation code is position in a fore part of the signal frame and the data symbols are position after the channel estimation code. In such structure of the signal frame, the channel estimation code is not only used for channel estimation, but also used as a Guard Period for reducing interference between two signal frames (that is, an extension cycle window of the channel estimation code is used to achieve a function of the GP), which greatly improves transmission efficiency of the MBMS. A length of the signal frame may be matched with a length of a frame time slot of the existing TD-SCDMA system, or may also be configured according to data transmission efficiency, cell coverage and a number of the cells of macro diversity. Since the transmission of an MBMS, which is different from that of a traditional unicast voice and data service, needs only one channel estimation code in a signal frame, the length of the basic channel estimation code can be shortened to extend the length of the extension cycle window, that is, only one channel estimation code is used within a time slot for transmitting a Broadcast/Multicast Service. Such technology is different from a channel estimation code used in a time slot for a general service in the existing TD-SCDMA system. Particularly, in the prior art, a plurality of users need to be supported within one time slot, the plurality of users are differentiated by different channel estimation codes which are generated by cyclically shifting the same basic channel estimation code by different lengths, while in the broadcast/multicast technology, the same signals are transmitted to and received by multiple users, without differentiating the multiple users by channel estimation codes.

The construction of the channel estimation code in the present embodiment is the same as the generation of the channel estimation code in the existing TD-SCDMA system, that is, a channel estimation code with a certain rule is constructed based on a Steiner estimator, so that a channel matrix of channel estimation codes at a receiving side is cyclically correlative, and thereby accurate channel estimation can be obtained by using a fast algorithm based on the FFT.

In the implementation of macro diversity combining of an MBMS by using an SFN mode, all the network equipments involved in the SFN network use the same broadcast time slot, the same channel estimation code and scrambling code, and transmit a broadcast service with the same contents at the same frequency band, and broadcast signals from multiple network equipments are directly combined as multipath at an air interface by the receiving devices in the existing system. Therefore, the whole system needs only one basic channel estimation code to achieve the channel estimation, so that a channel estimation method with a single code set can be used. At an edge area of a cell, the channel estimation is simple and accurate because the broadcast signals from all the SFN cells may be subjected to the channel estimation.

Figure 7:
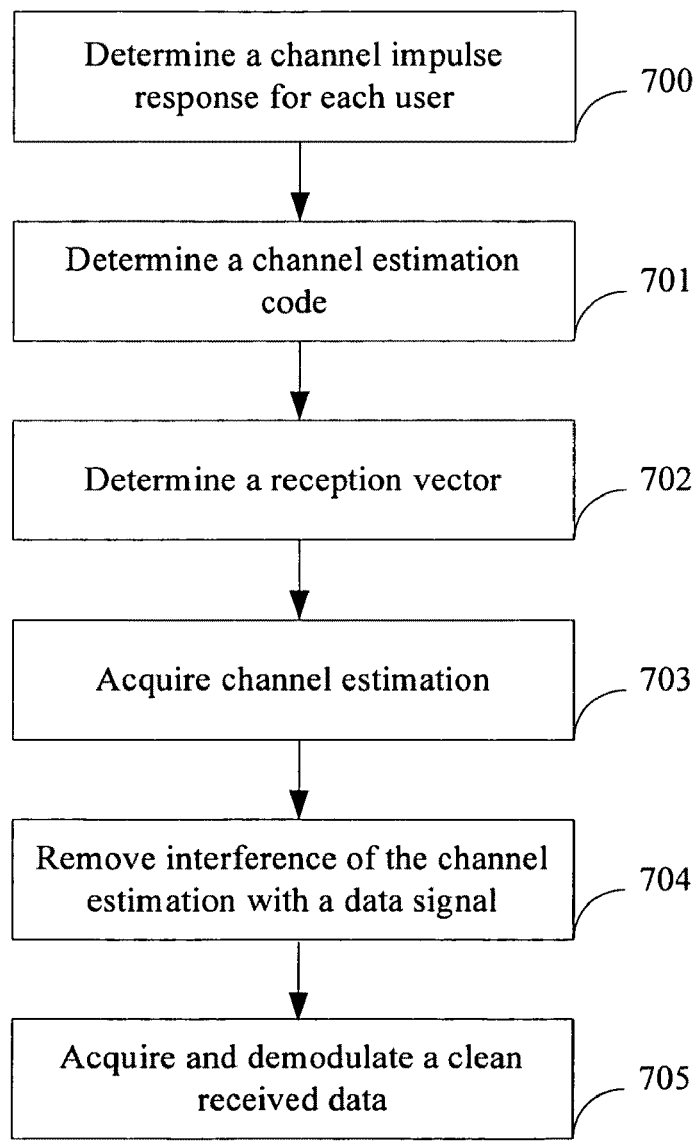
FIG. 7 is a flow chart of acquiring a channel estimation code and processing a data signal by a User Equipment according to an embodiment of the present invention.

The procedures of acquiring a channel estimation code from the above signal frame and processing a data signal by the User Equipment is shown in FIG. 7.

In step 700, a channel impulse response for each user is determined as shown in Equation (1):

$$h^{(k)} = (h_1^{(k)}, h_2^{(k)}, \ldots h_w^{(k)})^T \quad (1)$$

Assuming that the channel impulse response for each user is constant within one burst signal frame and W denotes a length of a window of a channel response for the user.

In step 701, a channel estimation code is determined. For an SFN system, the channel estimation codes for all users are the same, as expressed in Equation (2):

$$m = (m_1, m_2, \ldots m_{L+w-1})^T \quad (2)$$

where, L denotes a length of a unique reception vector determined from the channel estimation code and used for channel estimation.

In step 702, the reception vector is determined. Since the channel estimation code without being subjected to spread spectrum is transmitted to a receiving side at a radio frequency (RF) after being directly subjected to pulse shaping, a reception vector for the channel estimation code of the k-th user after passing the channel is expressed in Equation (3):

$$e^{(k)} = \begin{bmatrix} m_1 & & & \\ m_2 & m_1 & & \\ \vdots & \vdots & \ddots & \\ m_w & m_{w-1} & \ldots & m_1 \\ \vdots & m_w & & m_2 \\ \vdots & \vdots & & \vdots \\ m_{w+L-1} & m_{w+L-2} & \ldots & m_L \\ & m_{w+L-1} & & \vdots \\ & & \ddots & \vdots \\ & & & m_{w+L-1} \end{bmatrix} \cdot \begin{bmatrix} h_1^{(k)} \\ h_2^{(k)} \\ \vdots \\ h_w^{(k)} \end{bmatrix} + n^{(k)} \quad (3)$$

$$= G \cdot h^{(k)} + n^{(k)}$$

$$k = 1, 2, \ldots K$$

where, G denotes a cyclic matrix, and $n^{(k)}$ is a noise matrix.

After the length W of the channel response is given, because the channel estimation code is positioned between data segments of two signal frames, W−1 bits of symbols in the front of the channel estimation code at the receiving side is interfered with data symbols of a preceding signal frame, and W−1 bits of symbols in the rear of the channel estimation code influence with the reception of the data segment which is in the same signal frame with the channel estimation code, therefore, the W-th~(W+L−1)-th bits of symbols are determined by the channel estimation code only. To obtain accurate channel estimation, a chip including the middle W~W+L−1 bits of symbols of the channel estimation code is taken as an observation value, and the corresponding matrix G is adaptively modified, then a reception vector as expressed in Equation (4) is obtained.

$$\tilde{e}^{(k)} = \begin{bmatrix} m_w & m_{w-1} & \ldots & m_1 \\ \vdots & m_w & \ldots & m_2 \\ \vdots & \vdots & \ldots & \vdots \\ m_{w+L-1} & m_{w+L-2} & \ldots & m_L \end{bmatrix} \cdot \begin{bmatrix} h_1^{(k)} \\ h_2^{(k)} \\ \vdots \\ h_w^{(k)} \end{bmatrix} + \tilde{n}^{(k)} \quad (4)$$

$$= \tilde{G} \cdot \tilde{h}^{(k)} + \tilde{n}^{(k)}$$

$$k = 1, 2, \ldots K$$

where, the matrix $\tilde{G}$ is still a cyclic matrix. For an SFN system, $\tilde{G}$s of all users are the same, and are determined from a basic code of the channel estimation code, which is used to generate a code set.

In step 703, channel estimation is acquired. A value $h^{(k)}$ at certain time is solved according to Equation (4), and a value of the channel estimation can be obtained with maximum-likelihood Criterion and simplification, as expressed in Equation (5):

$$\hat{h}^{(k)} = \tilde{G}^{-1} \tilde{e}^{(k)} \quad (5)$$

Since the matrix $\tilde{G}$ is a cyclic matrix, the calculation can be simplified by Discrete Fourier Transform (DFT) using the property of the cyclic matrix, as expressed in Equation (6):

$$\hat{h}^{(k)} = IDFT\left(\frac{DFT(\tilde{e}^{(k)})}{DFT(\tilde{G})}\right) \quad (6)$$

Relatively accurate channel estimation can be obtained in shorter time by using the above channel estimation method. When a user moves at a low speed, the channel estimation may be performed on a data signal using only the channel estimation code in the signal frame. Only when the user moves at a high speed, an interpolation value derived from the channel estimation for the current signal frame and the channel estimation for the next adjacent signal frame may be used to perform channel estimation on the data signal, in order to achieve more accurate channel estimation.

In step 704, the interference of the channel estimation code with the data signal is removed. When the length of the channel response is W, the trailing (the W−1 bits of symbols in the rear) of the channel estimation code interferes with the reception of a data segment in the signal frame, and the trailing (the W−1 bits of symbols in the rear) of the data segment in the signal frame may overlap with the extension cycle window (the W−1 bits of symbols in the front) of the channel estimation code in next signal frame. To obtain a clean data signal without interference, the interferences of these two channel estimation codes with the data signal have to be removed. Particularly, to remove the interferences, after obtaining relatively accurate channel estimation, the receiving side reconstructs amounts of the interferences of the two channel estimation codes with the data segment, and subtracts the two amounts of the interferences from the received data, thereby obtaining the clean data signal received for demodulation.

In view of the structures of the signal frame and the channel estimation code, both of the two interferences above are actually generated by the extension cycle windows of the channel estimation codes. If the user moves at a low speed, the two amounts of interferences can be reconstructed by using an extension cycle window of one channel estimation code and channel estimation of the current signal frame, and it is not necessary to reconstruct the two amounts of interferences after obtaining the channel estimation value of the next signal frame, thereby reducing time delay and a buffer and decreasing computation amount. If the user moves at a high speed, it is necessary to reconstruct the two amounts of interferences respectively after the completion of the channel estimation of two signal frames. In the above two cases, the method for reconstructing the amounts of the interferences are the same. Assuming $\hat{h}^{(k)}$ denotes accurate channel estimation obtained using the Steiner method and the length of the impulse response is W, then the extension cycle window of the channel estimation code is expressed in Equation (7):

$$m_{cycle\ window} = (m_{L+1}, m_{L+2}, \ldots, m_{L+w-1})^T \quad (7)$$

the amount of the interference of the channel estimation code with the data signal is expressed in Equation (8):

$$I = \hat{h}^{(k)} \otimes m_{cycle\ window} = (i_1, i_2, \ldots, i_{w-1}, i_w, i_{w+1}, \ldots, i_{2w-2}) \quad (8)$$

the reconstructed components of the interference are expressed in Equations (9) and (10):

$$I_1 = (i_1, i_2, \ldots, i_{w-1}) \quad (9)$$

$$I_2 = (i_w, i_{w+1}, \ldots, i_{2w-2}) \quad (10)$$

the received data after the interference is removed is expressed in Equation (11):

$$\tilde{d}^{(k)} = d^{(k)} - I_1 - I_2 \quad (11)$$

In step 705, the clean received data is acquired for demodulating.

As can be seen from the above, by using the structure of the signal frame described above, the length of the extension cycle window can be flexibly adjusted to satisfy the macro cell coverage for the MBMS and the macro diversity reception of multi-cells. By increasing the transmission power, the macro cell coverage for the MBMS can be achieved. By using the structure of the signal frame described above, clean channel estimation can be obtained, and by removing the interference of the channel estimation code with a data signal, a clean data signal can be obtained for demodulating.

Figure 8A:
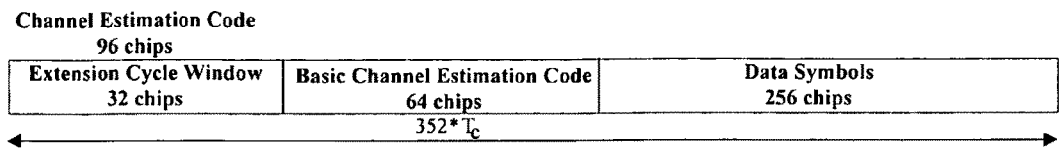
FIG. 8A is a schematic diagram of a first example of a structure of a broadcast time slot when an MBMS is transmitted with an independent carrier resource according to an embodiment of the present invention.
Figure 8B:
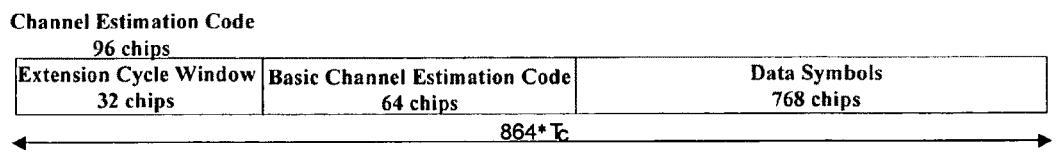
FIG. 8B is a schematic diagram of a second example of a structure of a broadcast time slot when an MBMS is transmitted with an independent carrier resource according to an embodiment of the present invention.
Figure 8C:
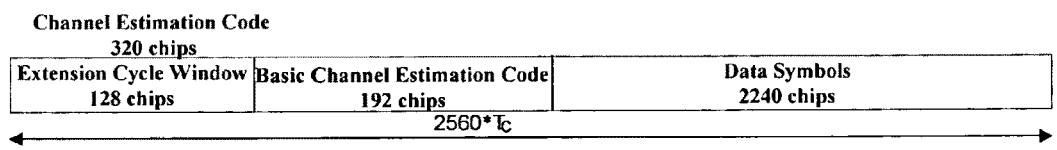
FIG. 8C is a schematic diagram of a third example of a structure of a broadcast time slot when an MBMS is transmitted with an independent carrier resource according to an embodiment of the present invention.

A specific example in which an MBMS is transmitted over an independent carrier resource is given in the present embodiment. As shown in FIG. 8A, $T_{channel\ estimation} = 0.781 \times 96 = 74.976$ μs, $W = 32 \times 0.781 = 24.992$ μs, and $T_{Data} = 0.781 \times 256 = 199.936$ μs, where $T_{channel\ estimation}$ denotes the duration of the channel estimation code, W denotes the length of the extension cycle window for the channel estimation, and $T_{Data}$ denotes the duration of the data block. As shown in FIG. 8B, $T_{channel\ estimation} = 0.781 \times 96 = 74.976$ μs, $W = 32 \times 0.781 = 24.992$ μs and $T_{Data} = 0.781 \times 702 = 599.808$ μs, where $T_{channel\ estimation}$ denotes the duration of the channel estimation code, W denotes the length of the extension cycle window for the channel estimation, and $T_{Data}$ denotes the duration of the data block. As shown in FIG. 8C, for a High Code Rate (HCR) TDD system, $T_{channel\ estimation} = 0.26041 \times 320 = 83.33$ μs, $W = 128 \times 0.26041 = 33.33$ μs, $T_{Data} = 0.26041 \times 2240 = 591.584$ μs, where $T_{channel\ estimation}$ denotes the duration of the channel estimation code, W denotes the length of the extension cycle window for the channel estimation, and $T_{Data}$ denotes the duration of the data block.

Figure 8D:
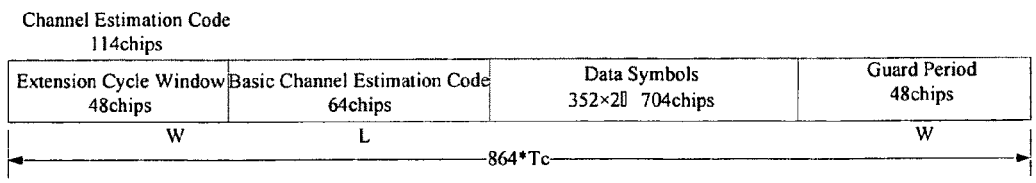
FIG. 8D is a schematic diagram of a structure of a broadcast time slot when an MBMS is multiplexed along with another service and transmitted with a carrier resource according to an embodiment of the present invention.

According to the present embodiment, when the MBMS is multiplexed and transmitted along with other service with a carrier resource, improvement can be made only for the structure of the broadcast time slot, and the structure of a frame of the system and the structure at a time slot for another service are maintained the same as the corresponding structures in the existing TD-SCDMA system. As shown in FIG. 8D, based on the structure of the broadcast time slot of the existing TD-SCDMA system, a length of the time slot remains unchanged, two data blocks in the time slot are combined and a channel estimation code is positioned at the starting position of the broadcast time slot. In the conventional structure of a time slot, the length of the channel estimation code is designed to satisfy the requirement for multi-user channel estimation and joint detection in one time slot. However, in a broadcast service application, if time slot is entirely used for an MBMS, only one channel estimation code is needed in one time slot (which is equivalent to that data of only one user is transmitted), so that the length of the original basic channel estimation code can be shortened to extend the length of the extension cycle window. In addition, the length of the Guard Period needs to be extended correspondingly to match with the extension cycle window. Considering that the length of the data block in the original time slot is maintained unchanged, the extension of the length of the Guard Period is provided by shortening the length of the basic channel estimation code.

There is a substantial difference between a conventional time slot and a broadcast time slot. The conventional time slot needs to support multiple users. To implement a joint detection algorithm based on a Steiner channel estimation method, it is necessary to construct a channel estimation code with cyclic correlation for each user (at most 16 users for one time slot) on the basis of one basic channel estimation code. However, in the broadcast time slot, data for all users are the same, which is equivalent to that only one channel estimation code is needed in one broadcast time slot. Therefore, for the broadcast time slot according the present embodiment, the basic channel estimation code needs not have a length of 128 chips as in the conventional time slot, and may be shortened as long as quality of channel estimation is ensured.

When a length W of a channel response is given, an extension cycle window (the length of which is equal to the length W of the channel response) of 48 chips and a basic channel estimation code of 64 chips constitute a channel estimation code of 112 chips. A Guard Period of 16 chips is present in the most rear of a preceding conventional time slot, and the preceding conventional time slot does not interfere with the channel estimation code of the broadcast time slot, so that relatively clean channel estimation can be obtained. The W−1 bits of symbols (47 chips) in the rear of the channel estimation code may interfere with the received data segment, and the influence of duration extension of the channel estimation code on the received signal can be removed from the received data, thereby obtaining clean received data. A Guard Period is still maintained in the most rear of the broadcast time slot in the present embodiment, but has a length far longer than that of the Guard Period of the conventional time slot. The length of the Guard Period is matched with the length W of the channel response, to ensure that broadcast data (even if transmission power is increased at the broadcast time slot) does not interfere with data of other conventional time slots.

Among parameters of burst structure of the broadcast time slot in the present embodiment, as shown in FIG. 8D, $T_{channel\ estimation}=0.781\times112=87.5$ µs, $W=48\times0.781=37.5$ µs, $T_{Data}=0.781\times704=549.8$ µs, and for the Guard Period $T_{Gp}=0.781\times48=37.5$ µs, where $T_{channel\ estimation}$ denotes the duration of the channel estimation code, W denotes the length of the extension cycle window for the channel estimation, $T_{Data}$ denotes the duration of the data block, and $T_{Gp}$ denotes the duration of the Guard Period. As can be seen from the above, compared with the conventional broadcast time slot, the total length of the broadcast time slot in the present embodiment and the length of the data block remain unchanged, and the total length of the channel estimation code is reduced, where the length of the basic channel estimation code is reduced and the length of the extension cycle window and the length of the Guard Period are extended, with the length of the extension cycle window and the length of the Guard Period being equal.

The method for constructing a channel estimation code of a broadcast time slot described above is consistent with the method for generating a channel estimation code in an existing system. To simplify implementation, a portion of a basic channel estimation code in the existing system may directly adopted as the channel estimation code of the broadcast time slot, or other specific channel estimation code may be adopted, but a channel estimation code with a certain rule is still constructed based on the Steiner estimator, so that a channel matrix of channel estimation codes at a receiving side is cyclically correlative, and channel estimation can be obtained using a fast algorithm based on the FFT. The flows for channel estimation and removing of interference in detail are identical to the flows for channel estimation and removing of interference of a signal frame described above, and the repetitive description thereof is omitted.

With the structure of the broadcast time slot according to the present embodiment, a length of a convention time slot and a length of a data block are not changed, but a position and a length of a channel estimation code are changed, and processing flow (such as channel estimation, detection algorithm and frequency offset adjustment) on a signal needs to be adjusted correspondingly. However, modulating and encoding of the data completely conform to the existing standard. The change and the adjustment can be implemented based on software, which makes the whole system very flexible. Therefore, on a hardware platform of the existing system, macro diversity combining for multi-cells of a broadcast service can be achieved by only software upgrading, and deployment of an MBMS with macro cell mechanism can be achieved by using the maximum transmission power at the broadcast time slot.

By using the structure of the signal frame or the structure of the broadcast time slot according to embodiments of the present invention to transmit an MBMS, efficiency and performance of transmitting the service can be efficiently improved. By flexibly increasing a length of an extension cycle window of a channel estimation code and improving transmission power, macro diversity combining of multi-cells and macro cell coverage for an MBMS can be efficiently achieved.

Obviously, various alteration and modification can be made on the present invention by those skilled in the art without departing from the scope of the present invention. Thus, in the event that such alteration and modification on the present invention fall within the scope of the following claims and equivalent technique of the present invention, the present invention is intended to encompass such alteration and modification.

What is claimed is:

1. A method for transmitting a signal of a Broadcast/Multicast Service, comprising:
    mapping a channel estimation code and a data symbols of the Broadcast/Multicast Service to a resource unit, wherein the channel estimation code is mapped in front of the data symbols in a time slot for the Broadcast/Multicast Service, a length of the time slot for the Broadcast/Multicast Service is equal to that for a unicast service, a length of the data symbol in the time slot for the Broadcast/Multicast Service is equal to that for the unicast service, and the channel estimation code comprises a basic channel estimation code and an extension cycle window, wherein, a length of the basic channel estimation code of the channel estimation code in the time slot for the Broadcast/Multicast Service is smaller than that for the unicast service; and
    transmitting the resource unit.

2. The method according to claim 1, wherein one channel estimation code is present in one time slot for the Broadcast/Multicast Service.

3. The method according to claim 1, wherein the time slot for the Broadcast/Multicast Service comprises only the channel estimation code and the data symbols, and the extension cycle window of the channel estimation code is used as a Guard Period between adjacent time slots for the Broadcast/Multicast Service.

4. The method according to claim 3, wherein a length of the extension cycle window of the channel estimation code in the time slot for the Broadcast/Multicast Service is determined according to the cell coverage and the number of the cells of macro diversity.

5. The method according to claim 3, wherein the time slot for the Broadcast/Multicast Service further comprises a Guard Period.

6. The method according to claim 5, wherein,
    a length of the extension cycle window of the channel estimation code in the time slot for the Broadcast/Multicast Service is longer than that for the unicast service; and/or
    a length of the Guard Period in the time slot for the Broadcast/Multicast Service is longer than that for the unicast service.

7. The method according to claim 6, wherein the length of the Guard Period in the time slot for the Broadcast/Multicast Service is equal to that of the extension cycle window of the channel estimation code in the time slot for the Broadcast/Multicast Service.

8. The method according to claim 1, wherein a maximum transmission power at the time slot for the Broadcast/Multicast Service is larger than that for the unicast service.

9. The method according to claim 1, wherein a receiving side having received the resource unit acquires the channel estimation code for processing from a starting position of the time slot for the Broadcast/Multicast Service.

10. The method according to claim 9, wherein when the receiving side moves at a low speed, channel estimation is performed according to a channel estimation code in a time slot bearing a signal of the Broadcast/Multicast Service, and when the receiving side moves at a high speed, channel estimation is performed according to an interpolation value derived from channel estimation codes in two adjacent time slots bearing the signals of the Broadcast/Multicast Service.

11. A network equipment, comprising:
    a mapping unit adapted for mapping a channel estimation code and a data symbols of a Broadcast/Multicast Service to a resource unit, wherein the channel estimation code is mapped in front of the data symbols in a time slot for the Broadcast/Multicast Service, a length of the time slot for the Broadcast/Multicast Service is equal to that for a unicast service, a length of the data symbol in the time slot for the Broadcast/Multicast Service is equal to that for the unicast service, and the channel estimation code comprises a basic channel estimation code and an extension cycle window, wherein, a length of the basic channel estimation code of the channel estimation code in the time slot for the Broadcast/Multicast Service is smaller than that for the unicast service; and a transmitting unit adapted for transmitting the resource unit.

12. The network equipment according to claim 11, wherein when the time slot for the Broadcast/Multicast Service comprises only the channel estimation code and the data symbol, the extension cycle window of the channel estimation code is used by the mapping unit as a Guard Period between adjacent time slots for the Broadcast/Multicast Service.

13. The network equipment according to claim 11, wherein a length of the extension cycle window of the channel estimation code in the time slot for the Broadcast/Multicast Service is determined by the mapping unit according to the cell coverage and the number of the cells of macro diversity.

14. The network equipment according to claim 11, wherein when the time slot for the Broadcast/Multicast Service further comprises a Guard Period, a length of the extension cycle window of the channel estimation code in the time slot for the Broadcast/Multicast Service is determined by the mapping unit to be longer than that for the unicast service; and/or a length of the Guard Period in the time slot for the Broadcast/Multicast Service is determined by the mapping unit to be longer than that for the unicast service.

15. The network equipment according to claim 14, wherein the length of the Guard Period in the time slot for the Broadcast/Multicast Service is identical to that of the extension cycle window of the channel estimation code in the time slot for the Broadcast/Multicast Service.

16. A communication system, comprising:
 a network equipment adapted for mapping a channel estimation code and a data symbols of a Broadcast/Multicast Service to a resource unit, wherein the channel estimation code is mapped in front of the data symbols in a time slot the Broadcast/Multicast Service, a length of the time slot for the Broadcast/Multicast Service is equal to that for a unicast service, a length of the data symbol in the time slot for the Broadcast/Multicast Service is equal to that for the unicast service, and the channel estimation code comprises a basic channel estimation code and an extension cycle window, wherein, a length of the basic channel estimation code of the channel estimation code in the time slot for the Broadcast/Multicast Service is smaller than that for the unicast service, and for transmitting the resource unit; and a User Equipment adapted for receiving the resource unit and acquiring the channel estimation code for processing from a starting position of the time slot for the Broadcast/Multicast Service.

17. The communication system according to claim 16, wherein the network equipment comprises:
 a mapping unit adapted for mapping the channel estimation code and the data symbols of the Broadcast/Multicast Service to the resource unit, wherein the channel estimation code is mapped in front of the data symbols in the time slot for the Broadcast/Multicast Service, the length of the time slot for the Broadcast/Multicast Service is equal to that for the unicast service, the length of the data symbol in the time slot for the Broadcast/Multicast Service is equal to that for the unicast service, and the length of the basic channel estimation code of the channel estimation code in the time slot for the Broadcast/Multicast Service is smaller than that for the unicast service; and a transmitting unit adapted for transmitting the resource unit.

18. The communication system according to claim 16, wherein when the User Equipment moves at a low speed, channel estimation is performed according to a channel estimation code in a time slot bearing a signal of the Broadcast/Multicast Service, and when the User Equipment moves at a high speed, channel estimation is performed according to an interpolation value derived from channel estimation codes in two adjacent time slots bearing the signals of the Broadcast/Multicast Service.

* * * * *